No. 840,811. PATENTED JAN. 8, 1907.
W. L. VESTAL.
IRRIGATION GATE.
APPLICATION FILED JUNE 25, 1904.
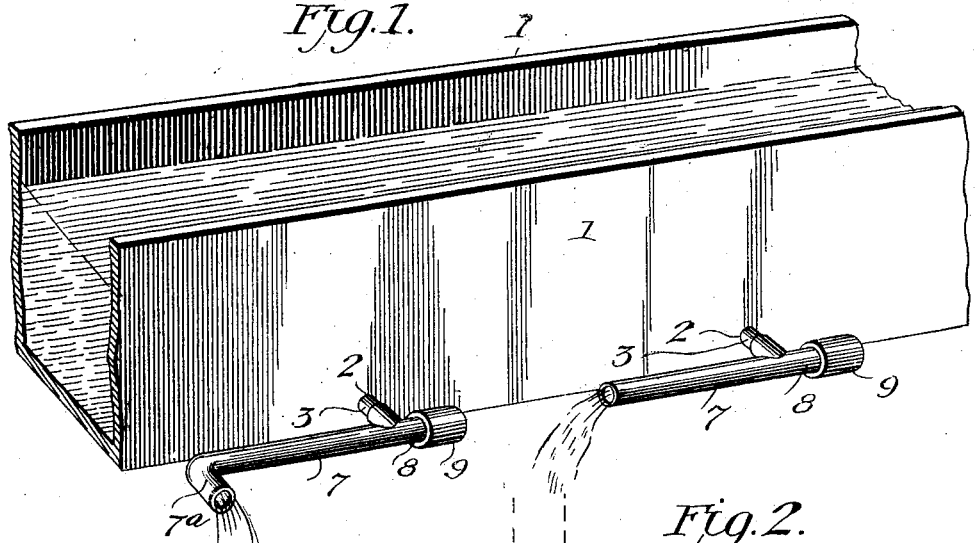
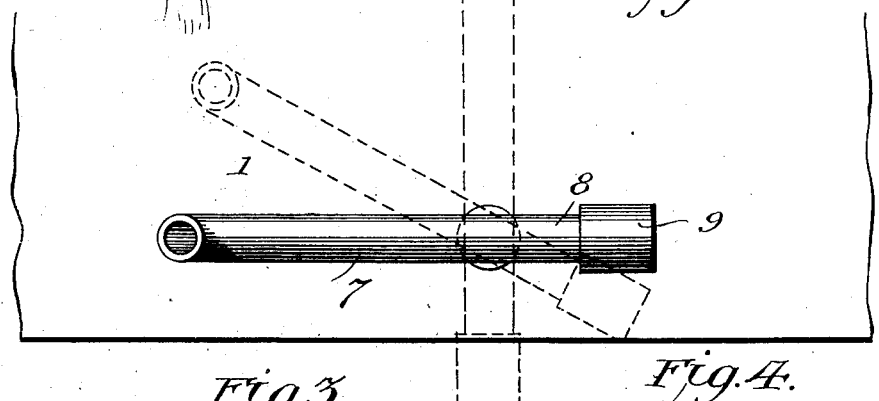
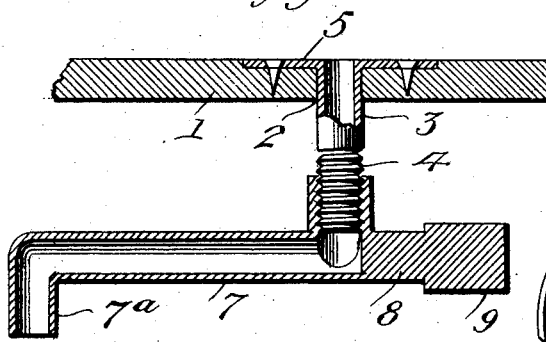
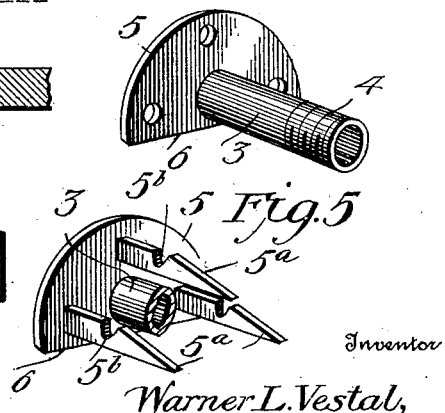
Witnesses
Inventor
Warner L. Vestal,
By Victor J. Evans
Attorney

UNITED STATES PATENT OFFICE.

WARNER L. VESTAL, OF SAN BERNARDINO, CALIFORNIA.

IRRIGATION-GATE.

No. 840,811.      Specification of Letters Patent.      Patented Jan. 8, 1907.

Application filed June 25, 1904. Serial No. 214,166.

*To all whom it may concern:*

Be it known that I, WARNER L. VESTAL, a citizen of the United States, residing at San Bernardino, in the county of San Bernardino and State of California, have invented new and useful Improvements in Irrigation-Gates, of which the following is a specification.

My invention relates to an irrigation-gate for use in connection with a flume or sluice.

In all places where lands are artificially irrigated it is usually the custom to dispose an irrigation box or flume along the edge of the land having the highest elevation. This box or flume is perforated on the side next to the land and near the bottom with holes two or more feet apart, these holes being provided with gates or cut-off means. The old forms or cut-off means or those now in use are unsatisfactory for many reasons, and the present improved gate has been devised to overcome the existing disadvantages in this class of devices.

The invention consists in the construction and arrangement of the several parts, which will more fully hereinafter be set forth.

In the drawings, Figure 1 is a perspective view of a portion of an irrigation box or flume, showing the improved gate thereto and in open position. Fig. 2 is a side elevation of a portion of an irrigation box or flume, illustrating a manner of adjusting the gate. Fig. 3 is a horizontal section through a portion of the side of a box or flume and the gate. Fig. 4 is a detail perspective view of the gate nipple or connection. Fig. 5 is a modified form of the nipple-attaching flange suitable for flumes of cement construction.

Similar numerals of reference are employed to indicate corresponding parts in the several views.

The numeral 1 designates an irrigation box or flume which is usually disposed along the edge of the land having the highest elevation and provided at intervals with a series of outlet-openings 2, one of the latter being shown in the accompanying drawings. Projecting through the opening 2 to the exterior of the inner side of the box or flume is a nipple or connection consisting of a tubular member 3 of suitable length having an outer screw-threaded terminal 4 and an inner attaching-flange 5, which may be countersunk in the box or flume, as shown by Fig. 3, and secured in place by means of screws or other fasteners. To maintain the nipple or connection in positive position, the lower edge 6 of the flange is horizontally straight. This particular form of nipple or outflow connection is also advantageous in forming a water-tight joint around the opening 2. For flumes of cement construction the nipple-flange 5 is formed with spurs 5ª, which are driven or embedded in the flume, the notches 5ᵇ giving the spurs the function of a barb to add to the security of their attachment to the flume.

The gate proper consists of a tubular arm 7, having one end made solid at 8 and provided with a weight 9. Extending inwardly from the arm adjacent to the inner terminal of the solid extremity thereof is an internally-screw-threaded coupling member 10, which is rotatably held on the outer screw-threaded extremity 4 of the tubular member 3 of the gate-nipple. A bore 11 through the arm 7 is of equal diameter throughout its length, corresponding with the diameter of nipple 3, and the terminals of said arm are fully open.

The arm 7 is long enough to have the outlet end thereof project above the level of the water in the box or flume when the gate is disposed vertically to thereby cut off the flow of water from the flume and is preferably turned outward at its extremity, as at 7ª, for the purpose of directing the water away from the flume. When the arm is turned down toward a horizontal plane, the water will commence to flow through the arm 7 as soon as the outlet end of the latter descends below the level of the water in the box or flume, and the amount of water permitted to flow over the land to be irrigated can thus be regulated at will and also directed to the part of the land adjacent to the gate to which it is desired to deliver the water. To direct the water to any particular part of the land adjacent thereto, the arm 7 is turned downwardly to the right or left, as indicated by dotted lines in Fig. 2.

The solidified extremity 8 of the gate, together with the weight 9, is sufficiently heavy to balance the remaining part of said gate or the arm 7 when partly or wholly filled with water. The said gate will thus remain in any position in which it is placed and the flow of water be regulated accordingly. The friction of the threaded screw connections will also aid in keeping the arm 7 in the desired position. The gate being devoid of any small parts will be rendered strong and durable and when necessary can be easily cleaned by simply depressing the arm 7 below the horizontal. Furthermore, there being but two essential parts comprised in the gate structure, the cost of manufacture and application thereof will be reduced to a minimum, particularly in view of the large number that will have to be attached to a flume or box.

As before indicated, the outflow of water through the gate may be regulated at will, especially by the employment of a series of gates as here contemplated, and by this means variations in irrigating different parts of the land may be pursued in accordance with the demands of the trees and other growths.

It will be also understood that changes in the proportions, dimensions, and minor details may be resorted to without departing from the spirit of the invention.

Having thus described the invention, what is claimed as new is—

A device of the character described comprising, in combination, an irrigation box or flume, a discharge-pipe projecting through one of the walls of the box, said pipe being provided with a threaded outer end and having at its inner end an attaching-plate fixed against rotation to said wall, and an adjustable nozzle upon the outer end of said discharge-pipe, said nozzle comprising a pipe or tube arranged at right angles to the aforesaid wall of the box or flume and provided with an eccentrically-arranged sleeve internally threaded to receive and engage the threaded end of said discharge-pipe, the longer arm of the nozzle being provided with a passage leading from said sleeve to the outlet end of the arm and the shorter arm of the nozzle being formed with an integral counterweight, all the parts of the nozzle being integral with each other and the nozzle *per se* being pivotally mounted directly upon the discharge-pipe.

In testimony whereof I have affixed my signature in presence of two witnesses.

WARNER L. VESTAL.

Witnesses:
W. S. BOGGS,
ROBINSON J. JONES.